(12) United States Patent
Yang et al.

(10) Patent No.: US 12,482,346 B2
(45) Date of Patent: Nov. 25, 2025

(54) OPTICAL FILTER, AND TEST ASSEMBLY AND METHOD FOR SMOKE DETECTOR

(71) Applicant: Gulf Security Technology Co., Ltd., Hebei (CN)

(72) Inventors: Maoqing Yang, Qinhuangdao (CN); Jialin Zhang, Qinhuangdao (CN); Dachuan Wang, Qinhuangdao (CN)

(73) Assignee: GULF SECURITY TECHNOLOGY CO., LTD., Hebei (CN)

( * ) Notice: Subject to any disclaimer, the term of this patent is extended or adjusted under 35 U.S.C. 154(b) by 0 days.

(21) Appl. No.: 18/308,002

(22) Filed: Apr. 27, 2023

(65) Prior Publication Data
US 2024/0078895 A1  Mar. 7, 2024

(51) Int. Cl.
G08B 29/14  (2006.01)
G02B 5/20  (2006.01)
G08B 17/103  (2006.01)

(52) U.S. Cl.
CPC ........... G08B 29/145 (2013.01); G02B 5/208 (2013.01); G08B 17/103 (2013.01)

(58) Field of Classification Search
CPC ..... G08B 29/145; G08B 17/103; G02B 5/208
USPC ......................................................... 340/514
See application file for complete search history.

(56) References Cited

U.S. PATENT DOCUMENTS

| | | | | |
|---|---|---|---|---|
| 3,940,623 A | * | 2/1976 | Hempowitz | G01N 21/314 356/414 |
| 4,009,389 A | * | 2/1977 | Lindholm | G07C 9/00 250/221 |
| 4,032,236 A | * | 6/1977 | Sick | A01B 33/06 356/432 |
| 4,068,940 A | * | 1/1978 | Bobbe | G03G 15/04027 399/180 |

(Continued)

FOREIGN PATENT DOCUMENTS

| | | |
|---|---|---|
| CN | 105115898 B | 8/2017 |
| CN | 104833655 B | 10/2018 |

(Continued)

OTHER PUBLICATIONS

Unknown, "FFE 0209-02 Replacement Obscuration Filter for Fireray Beam Detectors", TC Life Safety, 2022, 2 Pages.

(Continued)

*Primary Examiner* — Brian A Zimmerman
*Assistant Examiner* — Thang D Tran
(74) *Attorney, Agent, or Firm* — CANTOR COLBURN LLP

(57) ABSTRACT

The present application provides an optical filter, and a test assembly and method for a smoke detector. The optical filter comprises: a support; and a screen supported by the support, wherein the screen is composed of wires and mesh holes are defined between the wires, and the screen has a first side and a second side opposite to each other; wherein, the smoke detector comprises a light transmitter and a light receiver arranged in vicinity and an light reflector arranged opposite (Continued)

to the light transmitter and the light receiver, such that light emitted by the light transmitter is reflected to the light receiver via the light reflector; and wherein, during testing, the optical filter is arranged in both the light path from the light transmitter to the light reflector and the light path from the light reflector to the light receiver.

8 Claims, 5 Drawing Sheets

(56) References Cited

U.S. PATENT DOCUMENTS

| | | | | |
|---|---|---|---|---|
| 4,330,775 | A * | 5/1982 | Iwamoto | G01N 21/95623 382/210 |
| 5,712,449 | A * | 1/1998 | Miska | H05K 9/0015 428/36.1 |
| 6,166,642 | A * | 12/2000 | Farshid | G08B 21/0247 455/410 |
| 6,255,778 | B1 | 7/2001 | Yoshikawa et al. | |
| 6,757,114 | B1 * | 6/2004 | Rodriguez | G02B 6/29361 359/885 |
| 6,822,216 | B2 * | 11/2004 | Lang | G01B 11/272 250/221 |
| 8,797,531 | B2 | 8/2014 | Knox et al. | |
| 9,355,542 | B2 | 5/2016 | Bell et al. | |
| 9,835,549 | B1 * | 12/2017 | Erdtmann | G01N 21/53 |
| 9,863,890 | B2 | 1/2018 | Jungwirth et al. | |
| 10,763,966 | B1 * | 9/2020 | Deb | H04B 10/25759 |
| 2003/0089854 | A1 * | 5/2003 | Shifflett | G01N 21/3504 250/339.05 |
| 2005/0115722 | A1 * | 6/2005 | Lund | A62C 99/0018 169/17 |
| 2006/0142412 | A1 | 6/2006 | Yamaoka et al. | |
| 2007/0017281 | A1 * | 1/2007 | Rodgers | G01J 5/602 359/484.09 |
| 2008/0191888 | A1 * | 8/2008 | Penney | G08B 17/113 340/630 |
| 2010/0044549 | A1 * | 2/2010 | Bibo | G08B 17/103 250/201.1 |
| 2010/0050879 | A1 * | 3/2010 | Knox | G08B 17/107 55/486 |
| 2011/0188125 | A1 * | 8/2011 | Takenaka | G02B 5/124 359/634 |
| 2012/0069181 | A1 * | 3/2012 | Xue | G08G 1/166 348/241 |
| 2012/0105843 | A1 * | 5/2012 | Hirai | G02B 5/20 356/305 |
| 2012/0140231 | A1 * | 6/2012 | Knox | G01N 15/1434 356/442 |
| 2015/0096351 | A1 * | 4/2015 | Orsini | G01N 21/53 73/28.01 |
| 2015/0223694 | A1 * | 8/2015 | Funane | A61B 5/0042 600/407 |
| 2015/0234230 | A1 * | 8/2015 | Hirata | G02B 5/3058 359/485.05 |
| 2016/0154171 | A1 * | 6/2016 | Kato | G02B 6/0085 362/613 |
| 2016/0280229 | A1 * | 9/2016 | Kasahara | G06V 10/141 |
| 2016/0328935 | A1 * | 11/2016 | Fischer | G08B 29/145 |
| 2016/0328936 | A1 * | 11/2016 | Fischer | G01N 21/53 |
| 2018/0180848 | A1 * | 6/2018 | Ito | G02B 15/177 |
| 2019/0011617 | A1 | 1/2019 | Cheng et al. | |
| 2019/0113494 | A1 * | 4/2019 | Desjardins | G01N 33/0034 |
| 2019/0368934 | A1 * | 12/2019 | Rathore | G01J 3/021 |
| 2020/0012835 | A1 * | 1/2020 | Jiang | G06V 10/147 |
| 2020/0103670 | A1 * | 4/2020 | Cole | G03H 1/2294 |
| 2020/0369533 | A1 * | 11/2020 | Jackson | C02F 1/004 |
| 2020/0394899 | A1 * | 12/2020 | Lang | G06V 20/13 |
| 2021/0158686 | A1 * | 5/2021 | Lang | G05D 1/0214 |
| 2021/0341264 | A1 * | 11/2021 | Starr | F41J 5/02 |

FOREIGN PATENT DOCUMENTS

| | | |
|---|---|---|
| CN | 105571824 B | 1/2019 |
| CN | 213779877 U | 7/2021 |
| DE | 19517517 B4 | 7/2004 |
| DE | 102011088850 B3 | 4/2013 |
| EP | 2730316 B1 | 9/2019 |
| JP | 2013171177 A | 9/2013 |
| KR | 20210048968 A | 5/2021 |

OTHER PUBLICATIONS

Unknown, "MAB50R & MAB100R Reflective Beam Detectors", Cooper Lighting and Security, Menvier, Sep. 15, 2005, 12 pages.
Unknown, "Obscuration test filter" Autronica Fire & Security, Norsk, 2024, 1 Page.
European Search Report for Application No. 23170472.7, Issued Oct. 2, 2023, 8 Pages.

* cited by examiner

OPTICAL FILTER, AND TEST ASSEMBLY AND METHOD FOR SMOKE DETECTOR

CROSS REFERENCE TO A RELATED APPLICATION

The application claims priority to Chinese Patent Application No. 202210458515.0 filed Apr. 28, 2022, and all the benefits accruing therefrom under 35 U.S.C. § 119, the contents of which in its entirety are herein incorporated by reference.

FIELD OF THE INVENTION

The present invention relates to the field of smoke detectors, in particular to an optical filter, and a test assembly and method for smoke detector for use in smoke detector testing.

BACKGROUND OF THE INVENTION

Smoke detectors are used to detect smoke and fire. Common smoke detectors include ion smoke detectors, photoelectric smoke detectors and infrared beam smoke detectors. Infrared beam smoke detection is a fire detector which responds to the flue gas parameters around a linear narrow region within the detecting area. It mainly differs from the previous two kinds of point smoke detectors in that the light beam transmitter of the linear smoke detector emits light to the detecting area, and the photoelectric receiver receives the light beam from the detecting area and detects smoke based on the attenuation of the light beam. Infrared beam smoke detectors are divided into two types: opposite beam smoke detectors and reflective smoke detectors, wherein in a reflective smoke detector, the light beam transmitter and the photoelectric receiver are arranged on the same side while a reflector is arranged on the opposite side. When the infrared beam smoke detector is installed in a building or after a certain period of use, it is necessary to test the smoke detector to determine whether it is in normal operation. One way is to place an optical filter in the light path to simulate the situation of smoke blocking light, where the existing optical filters are mainly made by coating transparent material with black color or opening holes on a blocking material. However, these optical filters have a flat surface facing the light transmitter.

SUMMARY OF THE INVENTION

The object of the present application is to solve or at least alleviate the problems existing in the prior art.

According to one aspect, an optical filter for testing of a smoke detector is provided, which comprises: a support; and a screen supported by the support, wherein the screen is composed of wires and mesh holes are defined between the wires, and the screen has s first side and a second side opposite to each other; wherein, the smoke detector comprises a light transmitter and a light receiver arranged in vicinity and an light reflector arranged opposite to the light transmitter and the light receiver, such that light emitted by the light transmitter is reflected to the light receiver via the light reflector; and wherein, during testing, the optical filter is arranged in both the light path from the light transmitter to the light reflector and the light path from the light reflector to the light receiver, where at least the side of the wires of the screen facing the light transmitter of the smoke detector is convex so as to attenuate or eliminate light directly reflected back to the light receiver by the optical filter.

In one or more embodiments of the optical filter for testing of a smoke detector, both sides of the wires of the screen are convex.

In one or more embodiments of the optical filter for testing of a smoke detector, the support is a frame surrounding the screen.

In one or more embodiments of the optical filter for testing of a smoke detector, a cross section of the wires of the screen is circular, elliptical, square, triangular, pentagonal, hexagonal, heptagonal or octagonal, or of any other suitable shape.

In one or more embodiments of the optical filter for testing of a smoke detector, the wires of the screen define mesh holes of a triangular, square, diamond or hexagonal shape, or any other suitable shape.

In one or more embodiments of the optical filter for testing of a smoke detector, the wires of the screen are made of plastic or metal.

In one or more embodiments of the optical filter for testing of a smoke detector, the wires of the screen are made of nylon.

In one or more embodiments of the optical filter for testing of a smoke detector, the wires of the screen are braided, bonded or inserted into the support.

In one or more embodiments of the optical filter for testing of a smoke detector, the optical filter is integrally moulded with plastic.

According to another aspect, a test assembly for a smoke detector is also provided, which comprises: a smoke detector comprising a light transmitter and a light receiver arranged in vicinity and a light reflector arranged opposite to the light transmitter and the light receiver, such that light emitted by the light transmitter is reflected to the light receiver via the light reflector; and the optical filter according to the various embodiments.

According to yet another aspect, a test method for a smoke detector is further provided, which comprises: arranging the optical filter according to the various embodiments in a light path from a light transmitter to the light reflector and a light path from the light reflector to the light receiver of the smoke detector, at a distance of more than 0.5 meter from the light transmitter.

The device and method according to the embodiments of the present invention may accurately test a smoke detector.

BRIEF DESCRIPTION OF THE DRAWINGS

With reference to the accompanying drawings, the disclosure of the present application will become easier to understand. Those skilled in the art would readily appreciate that these drawings are for the purpose of illustration, and are not intended to limit the protection scope of the present application. In addition, in the figures, similar numerals are used to denote similar components, where.

DETAILED DESCRIPTION OF EMBODIMENT(S) OF THE INVENTION

It is easy to understand that, according to the technical solutions of the present invention, without changing the essential spirit of the present invention, those skilled in the art can propose multiple replaceable structural modes and implementations. Therefore, the specific embodiments and accompanying drawings below are only exemplary descriptions of the technical solutions of the present invention, and should not be regarded as the entirety of the present invention or as limitations or restrictions on the technical solutions of the present invention.

Orientation terms such as upper, lower, left, right, front, rear, front, back, top, bottom, etc. mentioned or possibly mentioned in this specification are defined relative to the configurations illustrated in the respective drawings. They are relative concepts, so they may change accordingly according to their different locations and different states of use. Therefore, these and other orientation terms shall not be construed as restrictive terms.

Figure 1:
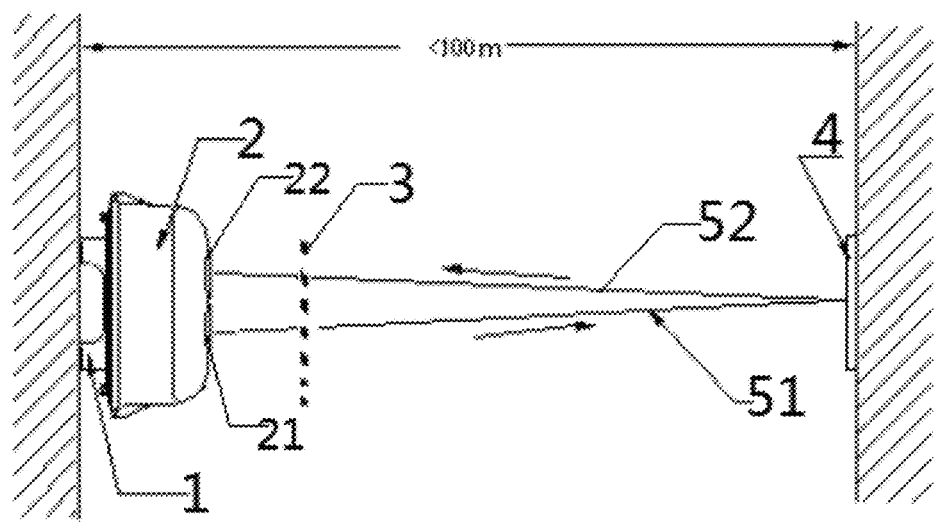
FIG. 1 shows a structural schematic diagram of a smoke detector according to an embodiment of the present invention.

Referring to FIG. 1, a smoke detector, specifically a reflective infrared beam smoke detector, is shown. The smoke detector comprises: a light transmitter 21 and a light receiver 22 arranged in vicinity. The light transmitter 21 and the light receiver 22 can, for example, be integrated in the same housing 2 and mounted at a certain height on the wall of a building through a mounting support 1. A light reflector 4 is arranged on the wall opposite to the light transmitter 21 and the light receiver 22, so that light emitted by the light transmitter 21 passes through a light path 51, is reflected by the light reflector 4, passes through a light path 52, and then comes to the light receiver 22. The light can be infrared beam, which is not to be seen by human eyes, and the distance between the two walls can reach up to 100 meters, thus detecting a relatively large indoor space. When there is smoke in the room, the light intensity received by the light receiver 22 decreases, thereby causing the smoke detector to sound an alarm. When the light path is completely blocked, e.g., due to an obstacle, the light receiver 22 will not receive the light at all, and the smoke detector will report an error after a short alarm.

The smoke detector shown in FIG. 1 needs to be tested for proper operation after it is installed in a building or after a certain period of time. One of the testing methods is that an optical filter 3 is arranged in both the path 51 from the light transmitter 21 to the light reflector 4 and the path 52 from the light reflector 4 to the light receiver 22 at the time of testing, where the optical filter 3 attenuates the light that is reflected back to the light receiver 22 and thus triggers the smoke detector to sound an alarm. However, since the existing optical filters that are made by coating black color on transparent materials or by opening holes on blocking materials have a flat surface facing the light transmitter 21, part of the light will be directly reflected back to the light receiver 22 by the optical filter 3, where the light superimposes onto the light reflected back to the light receiver 22 via the light reflector 4, thus reducing the reliability of the test results and even in some cases leading to failure of sounding an alarm from the smoke detector. However, as a matter of fact, the smoke detector is in normal operation then.

Figure 2:
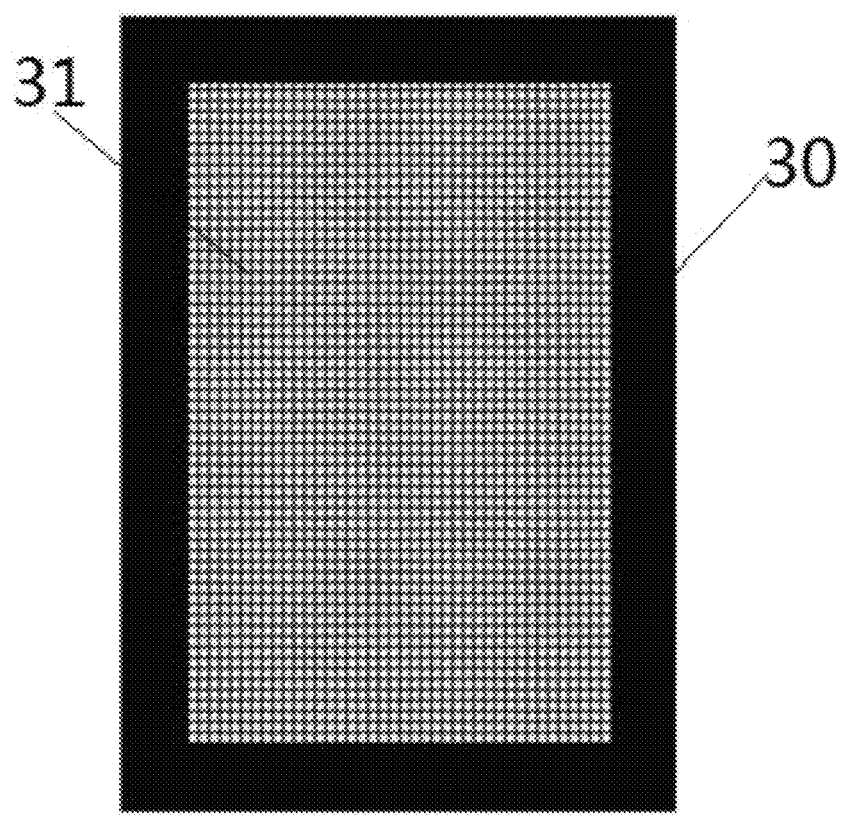
FIG. 2 shows a schematic diagram of an optical filter for a smoke detector according to an embodiment of the present invention.
Figure 3:
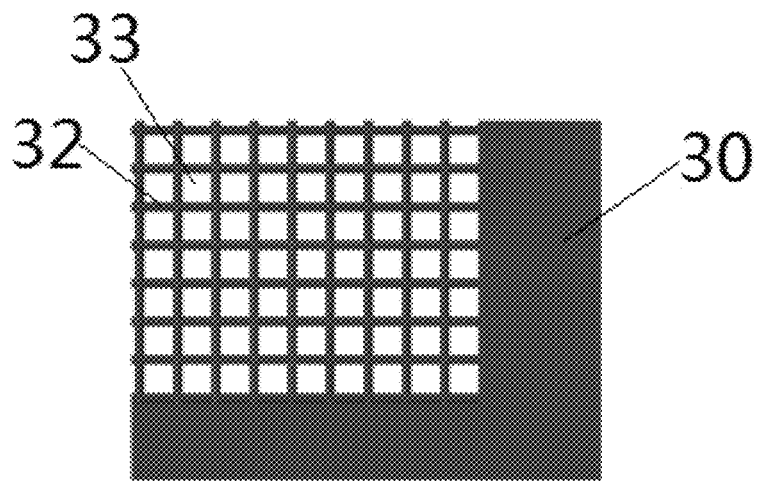
FIGS. 3 and 4 show partial enlarged views of optical filters for a smoke detector according to an embodiment of the present invention.
Figure 4:
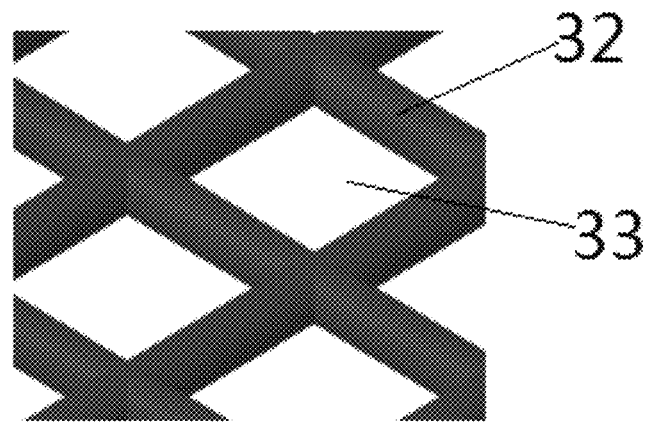

FIGS. 2 to 4 show an optical filter according to an embodiment of the present invention. The optical filter 3 comprises: a support 30; a screen 31 supported by the support 30. The screen 31 is composed of wires 32 and mesh holes 33 are defined between the wires 32. The screen 31 has a first side and a second side opposite to each other. During testing, the optical filter 3 is arranged in both the light path 51 from the light transmitter 21 to the light reflector 4 and the light path 52 from the light reflector 4 to the light receiver 22, and is substantially perpendicular to the light paths 51, 52. It should be understood that, in practice, the light paths 51, 52 are substantially parallel to each other. In the illustrated embodiment, however, the light paths 51, 52 are depicted to have a relatively large angle for clarity purposes. In the embodiments of the present invention, at least the side of the wires 32 of the screen 31 that faces the light transmitter 21 of the smoke detector is convex so as to attenuate or eliminate the light directly reflected back to the light receiver by the optical filter 3. Compared with the prior art in which the surface facing the light transmitter 21 is a plane, the embodiments of the present application enable light reflected by the wires 32 of the screen 31 to scatter around without interfering with the testing.

In some embodiments, the wires 32 of the screen 31 of the optical filter has a convex shape on one side, at which point it is necessary to make this side face the light transmitter 21 during testing. In an alternative embodiment, the wires 32 of the screen 31 of the optical filter are convex on both sides. In some embodiments, the support 30 is a frame surrounding the screen 31. In an alternative embodiment, the support 30 may be arranged only on some edges of the screen. The support 30 can be of suitable width to provide sufficient support for the screen so as to ensure its strength. On the other hand, the arrangement of a support 30 facilitates hand-held testing by the tester. In some embodiments, the support 30 may include a handle part to be hold by the tester to further facilitate hand-held testing by the tester. In an alternative embodiment, the support 30 may include a connecting part to connect to various test machines.

Figure 5:
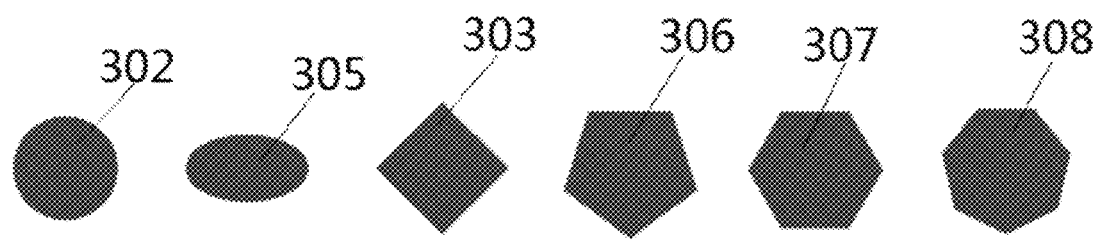
FIG. 5 shows cross-sectional views of the wires of screens of optical filters according to an embodiment of the present invention.
Figure 6:
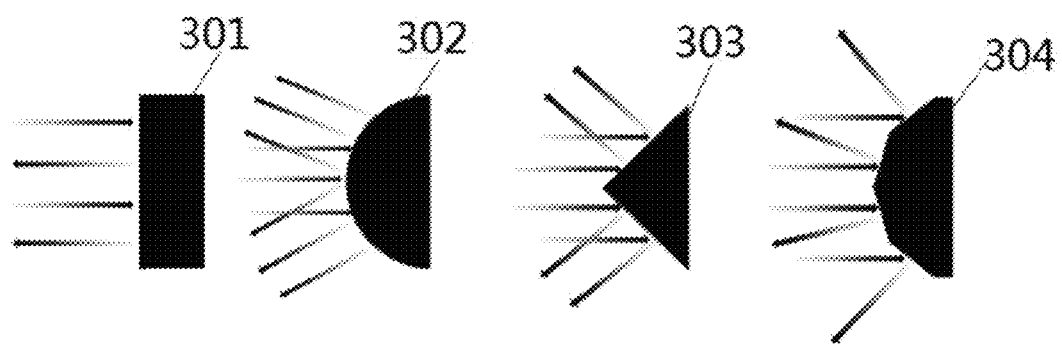
FIG. 6 shows schematic diagrams of light reflections from screen wires of various cross-sectional shapes.

With continued reference to FIGS. 5 and 6, in some embodiments, the cross section of the wires 32 of the screen 31 may be circular as shown in 302 of FIG. 5, or elliptical as shown in 305 of FIG. 5, or square as shown in 303 of FIG. 5 (where one corner of the square, instead of a plane, faces the light transmitter), or triangular (not shown), or pentagonal as shown in 306 of FIG. 5, or hexagonal as shown in 307 of FIG. 5, or heptagonal as shown in 308 of FIG. 5, or octagonal (not shown), while maintaining a convex shape on the side facing the light transmitter. As can be seen from FIG. 6, when the plane shown in 301 is used, the reflected light is in the opposite direction to the incident light, and the reflected light superimposes onto the returned light beam reflected by the reflector 4 into the light receiver, thereby causing interference. However, when the circular cross section 302, the square cross section 303 or the polygonal cross section 304 is used, the reflected light scatters sufficiently so as not to interfere with the detection.

Figure 7:
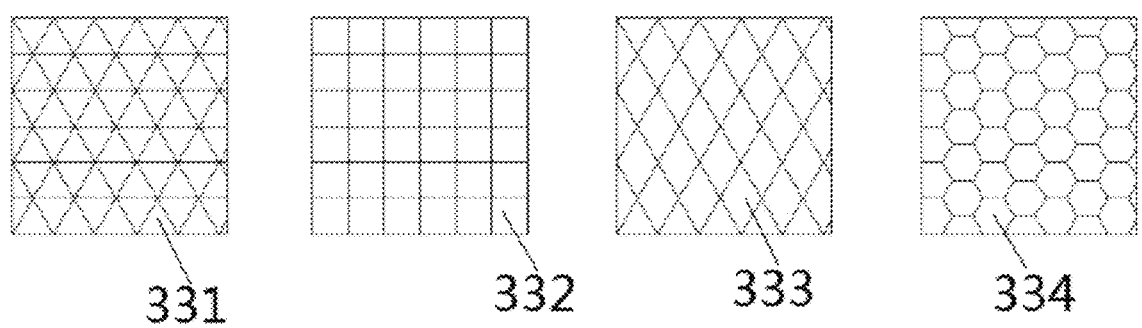
FIG. 7 shows schematic diagrams of screen holes of screens of an optical filter according to an embodiment of the present invention.

With continued reference to FIG. 7, some embodiments of the mesh holes defined by the wires 32 of the screen 31 are shown. The mesh holes may be triangular as shown in 331, square as shown in 332, diamond-shaped as shown in 333, hexagonal as shown in 334, or of any other suitable shape. On the other hand, the size of the mesh hole can be configured according to the requirements of the actual test.

In some embodiments, wires 32 of the screen 31 can be made of plastic or metal. Similarly, the support 30 can also be made of plastic or metal. In some embodiments, the support 30 and the screen can be integrally formed, e.g., by moulding with plastic. In some embodiments, the support 30 can be moulded separately with threading holes formed thereon, so that the wires 32 of the screen 31 can be braided around the support 30. In this way, different sizes of mesh holes can be achieved without multiple moulds. In some embodiments, the screen 31 can also be bonded or inserted into the support 30, or mounted to the support 30 in any suitable manner. In some embodiments, the wires 32 of the screen 31 can be made of nylon, the thickness of which can be adjusted according to actual requirements.

According to some aspects of the present invention, a test assembly for a smoke detector is also provided, which comprises: a smoke detector comprising a light transmitter and a light receiver arranged in vicinity, and a light reflector arranged opposite to the light transmitter and the light receiver, so that the light emitted by the light transmitter is reflected to the light receiver via the light reflector; and an optical filter according to the various embodiments.

According to another aspect of the present invention, a test method for a smoke detector is further provided, which comprises: arranging the optical filter according to the various embodiments in a light path from the light transmitter to the light reflector and a light path from the light reflector to the light receiver of the smoke detector, at a distance of more than 0.5 m from the light transmitter.

The specific embodiments of the present application described above are merely intended to describe the principles of the present application more clearly, wherein various components are clearly shown or described to facilitate the understanding of the principles of the present invention. Those skilled in the art may, without departing from the scope of the present application, make various modifications or changes to the present application. Therefore, it should be understood that these modifications or changes should be included within the scope of patent protection of the present application.

What is claimed is:

1. A test method for a smoke detector, comprising: obtaining an optical filter for testing of the smoke detector, the optical filter including: a support; and a screen supported by the support, wherein the screen is composed of wires and mesh holes are defined between the wires, and the screen has a first side and a second side opposite to each other, wherein the wires of at least one of the first or second side are convex; arranging the optical filter according in a light path from a light transmitter of the smoke detector to a light reflector and a light path from the light reflector to a light receiver of the smoke detector, wherein the wires of the at least one of the first or second side that are convex face the light transmitter of the smoke detector so as to attenuate or eliminate light directly reflected back to the light receiver by the optical filter; wherein the arranging comprises arranging the optical filter at a distance of more than 0.5 m from the light transmitter.

2. The test method according to claim 1, wherein both sides of the wires of the screen are convex.

3. The test method according to claim 1, wherein the support is a frame surrounding the screen.

4. The test method according to claim 1, wherein a cross section of the wires of the screen is circular, elliptical, square, triangular, pentagonal, hexagonal, heptagonal or octagonal.

5. The test method according to claim 1, wherein the wires of the screen define triangular, square, diamond-shaped or hexagonal mesh holes.

6. The test method according to claim 1, wherein the wires of the screen are made of plastic or metal.

7. The test method according to claim 1, wherein the wires of the screen are made of nylon, and are braided, bonded or inserted into the support.

8. The test method according to claim 1, wherein the optical filter is integrally moulded with plastic.

* * * * *